United States Patent [19]
Sandelman et al.

[11] Patent Number: 6,147,601
[45] Date of Patent: Nov. 14, 2000

[54] ELECTRONIC MESSAGE DELIVERY SYSTEM UTILIZABLE IN THE MONITORING OF REMOTE EQUIPMENT AND METHOD OF SAME

[75] Inventors: David Sandelman, Chatham; Daniel Shprecher, Highland Lakes, both of N.J.

[73] Assignee: Heat - Timer Corp., Fairfield, N.J.

[21] Appl. No.: 09/317,235

[22] Filed: May 24, 1999

Related U.S. Application Data

[60] Provisional application No. 60/115,305, Jan. 9, 1999.

[51] Int. Cl.⁷ .................................................. G08B 29/00
[52] U.S. Cl. .................. 340/506; 340/539; 340/825.06; 340/825.36; 340/825.49; 700/17
[58] Field of Search ..................................... 340/506, 511, 340/539, 825.06, 825.36, 825.49; 700/17

[56] References Cited

U.S. PATENT DOCUMENTS

| | | | |
|---|---|---|---|
| 5,061,916 | 10/1991 | French et al. | 340/522 |
| 5,400,246 | 3/1995 | Wilson et al. | 340/825.06 X |
| 5,517,690 | 5/1996 | Linquist et al. | 455/426 |
| 5,526,401 | 6/1996 | Roach, Jr. et al. | 455/426 |
| 5,528,675 | 6/1996 | Chen | 379/106.01 |
| 5,546,444 | 8/1996 | Roach, Jr. et al. | 455/412 |
| 5,594,740 | 1/1997 | LaDue | 455/410 |
| 5,629,687 | 5/1997 | Sutton et al. | 340/825.37 |
| 5,642,356 | 6/1997 | Wenk | 370/337 |
| 5,729,596 | 3/1998 | Reeder et al. | 379/102.04 |
| 5,734,645 | 3/1998 | Raith et al. | 370/329 |
| 5,748,104 | 5/1998 | Argyroudis et al. | 340/870.11 |
| 5,794,210 | 8/1998 | Goldhaber et al. | 705/14 |
| 5,855,008 | 12/1998 | Goldhaber et al. | 705/14 |

*Primary Examiner*—Daryl Pope
*Attorney, Agent, or Firm*—Levisohn, Lerner, Berger & Langsam

[57] ABSTRACT

A system and method for monitoring remote equipment are provided. A sensor is in communication with a piece of remote equipment, and an interface unit, having a message generating mechanism, is connected to the sensor. A central computer server is in communication with the interface unit and is adapted to receive messages generated by the interface unit. When the sensor detects an exception condition in the piece of remote equipment, the interface unit generates an incoming exception message and forwards the message to the server. The server forwards at least one outgoing exception message to at least one predetermined user-defined communication device based on the incoming exception message. Multiple outgoing exception messages may be forwarded to multiple communication devices in accordance with a user-defined message profile, or a single outgoing exception message may be forwarded in response to receipt of multiple incoming exception messages. The message profile is remotely configurable by the user.

43 Claims, 8 Drawing Sheets

ELECTRONIC MESSAGE DELIVERY SYSTEM UTILIZABLE IN THE MONITORING OF REMOTE EQUIPMENT AND METHOD OF SAME

This appln claims the benefit of U.S. Provisional No. 60/115,305 filed Jan. 9, 1999.

BACKGROUND OF THE INVENTION

1. Field of the Invention

The invention relates to monitoring systems, and more specifically to networks for remotely monitoring the condition of devices such as those employed in heating, ventilating, and cooling (HVAC) systems.

2. Description of the Related Art

It is desirable to be able to monitor remotely equipment that may require periodic preventive maintenance and/or that may require rapid response time should a catastrophic failure occur. For example, the components of a building's HVAC system must be monitored or checked frequently. Preventive maintenance must be performed on a constant basis, particularly with larger systems. Fault or failure conditions may vary in degrees of severity, however the contractor responsible for maintaining the HVAC equipment should be made aware of each failure in due course. Since a contractor, in all likelihood, is responsible for the care and maintenance of the installations of multiple clients, and since fault conditions may occur at any time of day or night, it is not practical for a contractor to remain on-site all the time. Remote detection at a central location (for example, the contractor's office) of fault conditions is desirable and often crucial.

Some remote monitoring devices have been developed. U.S. Pat. No. 5,629,687 to Sutton et al. describes a universal interface for remotely-monitored security or alarm systems. In Sutton et al., a local control unit at a monitored site can, under an event condition, initiate a telephone call to a central control unit to alert a human operator of an event such as an intrusion, fire, or other emergency at the site. The local control unit, via the telephone link, sends a serial number indicative of the specific site and emergency to the monitoring center computer. The monitoring center computer receives the serial number and alerts a human operator as to the emergency. The human operator can then act accordingly, e.g., establish one- or two-way communication with the local site.

U.S. Pat. No. 5,748,104 to Argyroudis et al. describes a wireless remote telemetry system which provides real-time reading and remote control of devices such as electricity meters. A home base unit communicates with remote metering units via cellular telephone lines. The home base unit also communicates with a central controller operated by the electric utility. When the utility determines that there is too much load on the power grid, for example, the central controller can send messages to an appliance to turn off. A customer could also remotely activate or deactivate an appliance via a cellular phone through the home base unit.

U.S. Pat. No. 5,061,916 to French et al. describes a system for remotely reporting, in graphical format, alarms or other conditions in a building's automation system. Sensors in a building are hooked up via a telephone line to control module which is, in turn, hooked up to a central controller. When a sensor detects a fault condition, graphical information is compiled at the central controller and transmitted to one or more remote facsimile machines.

All of the above systems and the prior art are limited in scope because they do not allow for sufficient flexibility in routing fault messages to a variety of different potential recipients of such messages via a variety of different media, depending on the urgency or nature of the fault. Also, the above systems and the prior art do not enable customers and contractors to enter or modify such information easily. As an example, a customer that has an HVAC system with a monitoring network may want to send certain non-emergency condition notifications (e.g., filter needs cleaning) to certain individuals (e.g., contractor/maintenance personnel) via a certain medium (e.g., e-mail) and emergency condition notifications (e.g., low or high refrigerant pressure) to other individuals (building owner, contractor, etc.) via other means (e.g., via beeper or other personal communication device). Such a list of who to contact via what means depending on which fault has occurred may be referred to as a "message profile". The conventional device/contractor interface requires a dedicated land line at both the HVAC device and the contractor; that is, the HVAC system requires its own phone line, and the contractor must have a dedicated modem line as well. Moreover, the conventional system does not allow for easy customer modifications to the message profile.

SUMMARY OF THE INVENTION

Accordingly, it is an object of the invention to provide a system for remotely monitoring electrical and/or mechanical equipment.

It is another object of the invention to provide a system for remotely monitoring electrical and/or mechanical equipment that can deliver messages to different individuals for different fault conditions.

It is another object of the invention to provide a system for remotely monitoring electrical and/or mechanical equipment that can deliver fault notification messages to different individuals for different fault conditions via different electronic media.

It is another object of the invention to provide a system for remotely monitoring electrical and/or mechanical equipment in which a customer may interactively modify its message profile.

It is another object of the invention to provide a system for remotely monitoring electrical and/or mechanical equipment in which a customer may interactively modify its message profile via the Internet.

The above and other objects are satisfied by the invention which is a remote equipment monitoring system and method for monitoring remote equipment. In the inventive method, the steps include determining a state of at least one parameter of at least one piece of remote equipment, communicating messages regarding the state to a central location as incoming messages, and forwarding exception messages based on the incoming messages to at least one user-defined end device.

The inventive system includes a sensor in communication with a piece of remote equipment, and an interface unit, connected to the sensor, having a message generating mechanism. A central computer server is in communication with the interface unit and is adapted to receive messages generated by the interface unit. When the sensor detects an exception condition in the piece of remote equipment (i.e., an operating condition that is either out of the ordinary or beyond nominal parameters), the interface unit generates an incoming exception message and forwards the message to the server. The server forwards at least one outgoing exception message to at least one predetermined user-defined end device based on the incoming exception message.

The system can contact a customer or contractor via a number of different media (fax, e-mail, pager, etc.) in case of an equipment failure. The contractor can determine which people to contact and which medium to use for which equipment failure. For example, if the condition is not very serious (e.g., filter needs cleaning), the contractor can set up the system to send a message via e-mail; if, however, it is serious (e.g., low/high refrigerant pressure), then the system can page the contractor and/or send a text message over his personal communication service (PCS). Also, the system includes the capability to send multiple messages to multiple recipients via differing media simultaneously for a given exception condition. Preferably, the system includes a centralized electronic message delivery device or server that routes the various incoming exception messages to the desired individuals via the desired electronic media in accordance with the predetermined message profile. More preferably, the contractor or consumer can access the centralized message server via the Internet and modify the message profile through software on the device.

DETAILED DESCRIPTION OF THE PREFERRED EMBODIMENTS

Equipment that needs to be monitored frequently, such as HVAC equipment, preferably operates within certain acceptable parameters. Some of these parameters are more crucial to the operation and/or life span of the equipment than are other parameters. For example, a low battery condition might be a lot less serious than a low coolant level condition. Whenever a piece of equipment operates outside its preferred parameters, an "exception" condition is created or said to exist. An exception condition can also be indicative of a regularly scheduled event occurring too often, too infrequently, or not at all. An exception condition could also be indicative of a measured value being beyond the design specification for the equipment.

When a monitored piece of equipment detects an exception condition, it activates its interface to the cellular phone network. The interface effectively acts as a cell phone in a roaming condition. The interface "attempts" to make a telephone call; because it is not recognized as being a resident of the local cell, the local cell (via the cellular network or mobile switching center) contacts the "home cell" of the interface to insure that the interface is in good standing to complete the "call." There really is no home cell; in actuality, what is taking the place of the home cell of a cellular telephone is a message routing service such as those provided by Aeris or Bell South Cellemetry. When the local cell is contacting the message routing service, it transmits the following information: the serial number of the interface; the multi-digit "phone number" assigned to the interface; and the multi-digit phone number that the interface is "attempting to call." The message routing service tells the local cell that the interface is okay and should not be blacklisted, that the call need not go through, and that the interface should be removed from the "okay to roam" list immediately.

The interface is not really trying to call anyone; the multi-digit phone number it was trying to call represents a multi-digit code of information that is being sent to the message routing service and may represent fault information (e.g., 212-555-1212 means "filter needs cleaning"). The phone number assigned to the interface (which is also sent along with the phone number it is "trying to contact") may not only indicates which unit is doing the transmitting but may also convey fault information, since many of the devices being monitored do not have a large number of different fault conditions. This type of technology, in which information is transmitted in the handshaking portion of a cellular transmitter communicating to a local cell, appears in U.S. Pat. Nos. 5,594,740 to LaDue and 5,546,444 to Roach, Jr. et al., and is commonly referred to as using control channel data. In LaDue (the Aeris version), the exception or status information is embedded in the digits of the "phone number" the interface is allegedly calling (the "dialed digits"); in Roach, Jr. (the Bell South Cellemetry version), the exception or status information is embedded in the electronic serial number (ESN) of the interface, a number which identifies the physical hardware of the device. The information which identifies which interface has sent a message may be embedded in the mobile identification number (MIN) assigned to the interface unit. In the Aeris system, the ESN may also contain interface identification information.

The present invention expands on this technology and includes the message delivery technique mentioned above. The Aeris or Bell South Cellemetry router transmits the exception data to the inventive message delivery system which forwards the information to the contractor who is responsible for maintaining the faulty equipment. The contractor is provided with an account on the message delivery system that he can access via the Internet. The contractor sets up the specific parameters of which exception conditions are reported to which individuals. The contractor also sets up by which media (fax, e-mail, PCS) these individuals are to be notified. Multiple individuals may be alerted as to a exception condition. All of this data constitutes the contractor's message profile. For example, both the contractor and the owner of the premises might be signaled if there is a low/high refrigerant condition, however perhaps only one of them would be notified if a filter required cleaning. The user may also set, as part of the message profile, that different messages be delivered to different individuals at different times of the day, week, month, season, or year. For example, a high priority exception message may be directed to one repair/maintenance entity during regular business hours but be directed to a different repair/maintenance entity at night. Similarly, the same person could be contacted by different means (e.g., fax or PCS) at different times. The content of the messages may also vary as a function of time.

In addition to notifying contractors when a problem arises, the interface may be programmed to check in once a day with an "all systems okay" message. This "okay" message also gets routed to the message delivery system. However, instead of being handled by an exception message subroutine in the message delivery system—the portion of the system which handles the above-mentioned fault messages—, the "okay" message is checked by a missing message subroutine. The missing message subroutine checks the entire list of HVAC interfaces that are supposed to signal "okay" from the message delivery system database. The missing message subroutine compares the entire list to the list of HVAC interfaces that actually checked in as "okay". If an interface failed to check in "okay" the message delivery system sends out the appropriate messages to the proper individuals via the selected media, all in accordance with the user's message profile lodged in the user's account with the message delivery system. The periodic "okay" or status message is not merely limited to providing a status "heartbeat" for the equipment but may also be employed to transmit information about the monitored piece of equipment. As will be explained below, the status message only requires a portion of its digits to convey equipment identification information, thus allowing other information to be transmitted as well. For example, the status message may include statistical information about the equipment such as how many cycles it has performed since the last message, the run time of the motor, etc. The status message may also serve as a reminder for routine maintenance, or it may report very minor or low-priority conditions that are not time sensitive.

The format of the message sent from the failing device to the local cell to the router to the message delivery system is a multi-digit code. The first digit can be for message format (e.g., status message, exception message, etc.). The sub-address is a digit or two reserved to identify to which unit that a transceiver interface is assigned is experiencing an exception condition; i.e., one transceiver interface may be assigned to a building having nine HVAC units, all connected to the transceiver via a bus line. The final digits would indicate the specific exception condition. The multi-digit message received by the message delivery system is normalized, converted into a regular text message, and forwarded to the user/contractor.

Figure 1:
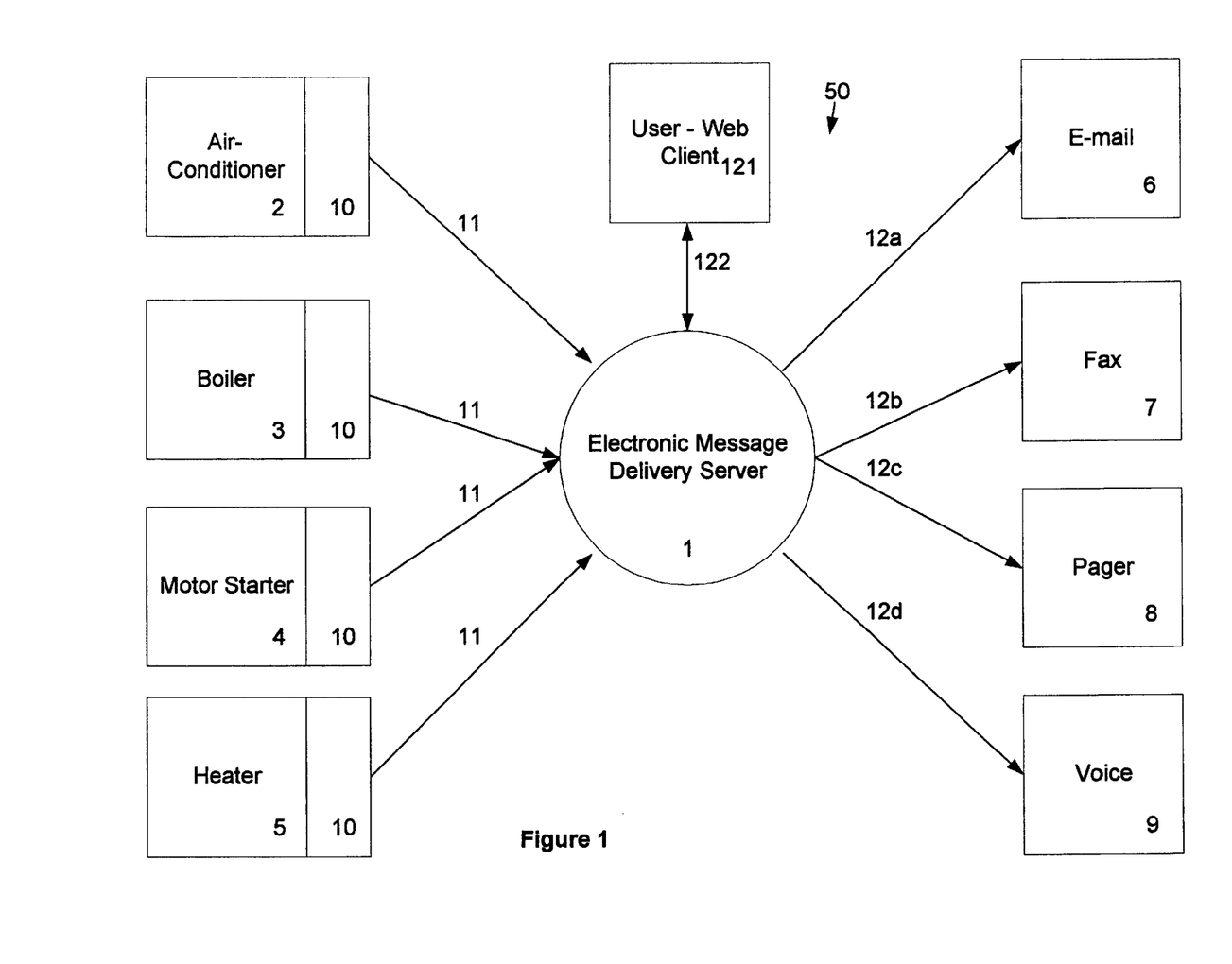
FIG. 1 is a schematic of a preferred embodiment of a system according to the invention.

Description will now be given of the preferred embodiments with reference to FIGS. 1–5. FIG. 1 shows an overall view of the inventive system 50. An existing piece of equipment may be monitored, for example; an air-conditioner 2, boiler 3, motor starter 4, heater 5, or any other piece of equipment they may be desired to be monitored. The existing piece of equipment is fitted with an interface unit 10. Periodically, the interface unit 10 sends to the message delivery server 1 a status signal to let the message delivery server 1 know that the equipment being monitored and the interface unit 10 are functioning correctly. When a predetermined exception condition occurs in the piece of equipment being monitored, the interface unit 10 sends an incoming exception message to the message delivery server 1. The message delivery server 1 then routes the message as an outgoing exception message to the appropriate user interface; e-mail 6, fax 7, pager 8, voice 9, etc., according to the message profile as configured by the user of the system 21 via the Internet 122.

Figure 2:
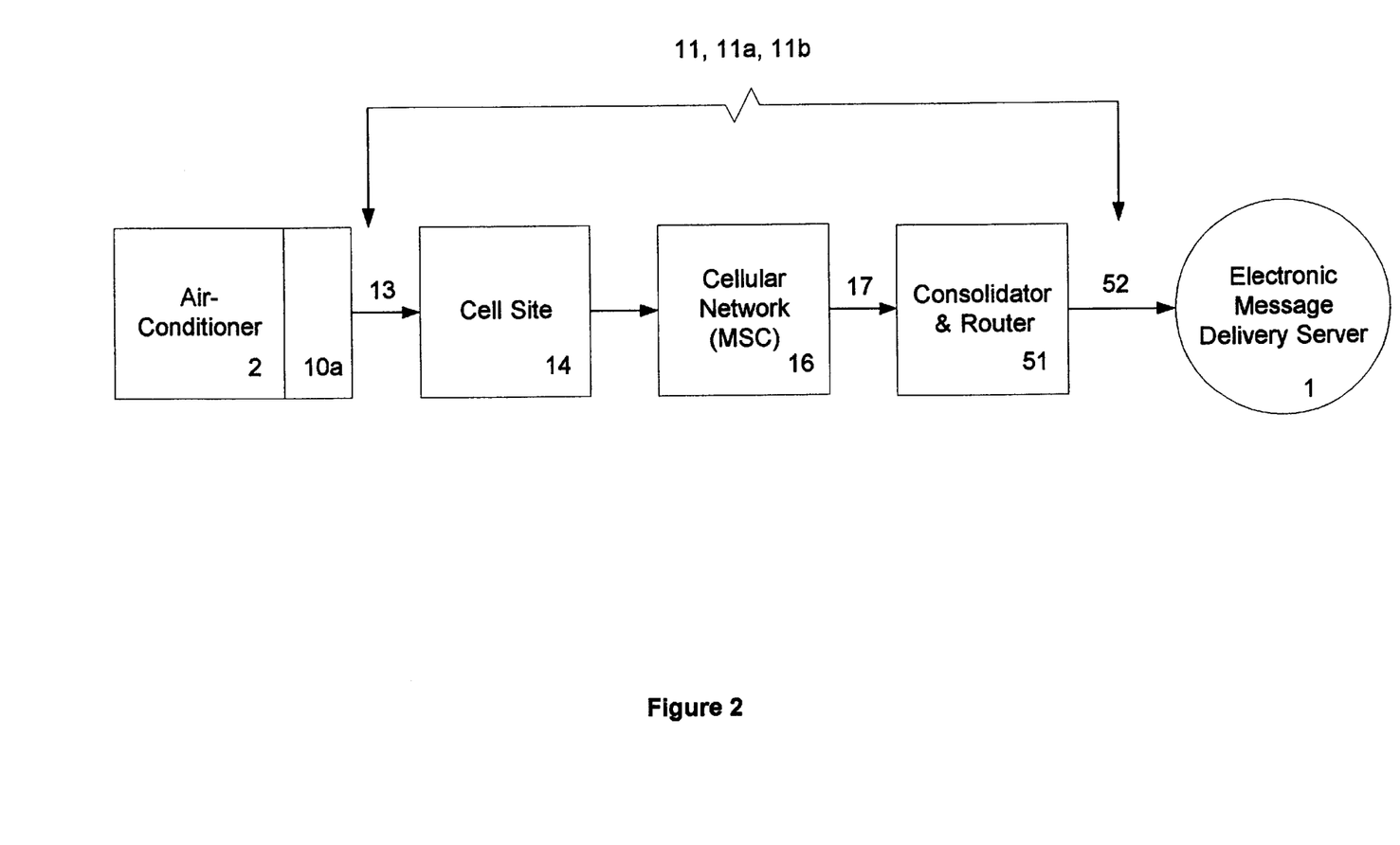
FIG. 2 is a schematic of a preferred embodiment of a link between the monitored equipment and the system according to the invention.

Messages from some of the interface units 10 may be delivered by means of wireless transmission over the cellular telephone network (see U.S. Pat. Nos. 5,594,740 and 5,546,444). FIG. 2 is a detailed view of link 11 shown in FIG. 1. A message is transmitted from the cellular interface unit 10a via a radio frequency link 13 to a nearby cellular transceiver site 14, the message is then routed to the cellular network or mobile switching center (MSC, e.g., a cellular carrier such as Bell Atlantic) 16 where the message is then delivered via data circuits 17 and via router 51 (e.g., Bell South Cellemetry or Aeris) to the message delivery server 1. As will be clear from the discussion of FIG. 4, reference numerals 11a and 11b refer to different types of links. Specifically, link 11a is for receiving incoming exception and status messages from interfaces 10 which are in regions wired for sending data via the dialed digits control channel; link 11b forwards messages along the ESN channel to the message server 1.

Figure 3A:
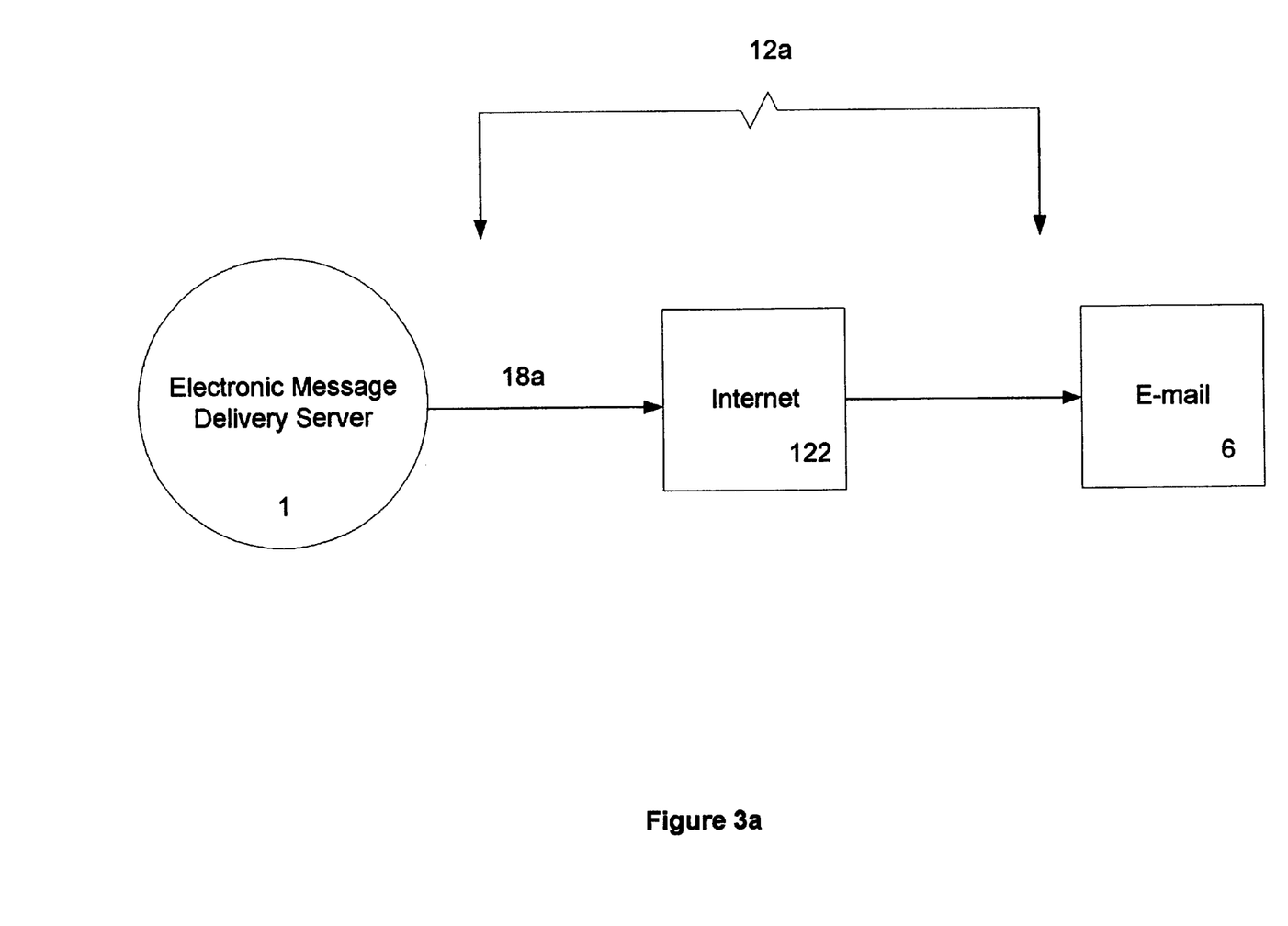
FIGS. 3a–d are schematics of links between an end-user's machine and the system according to the invention.
Figure 3B:
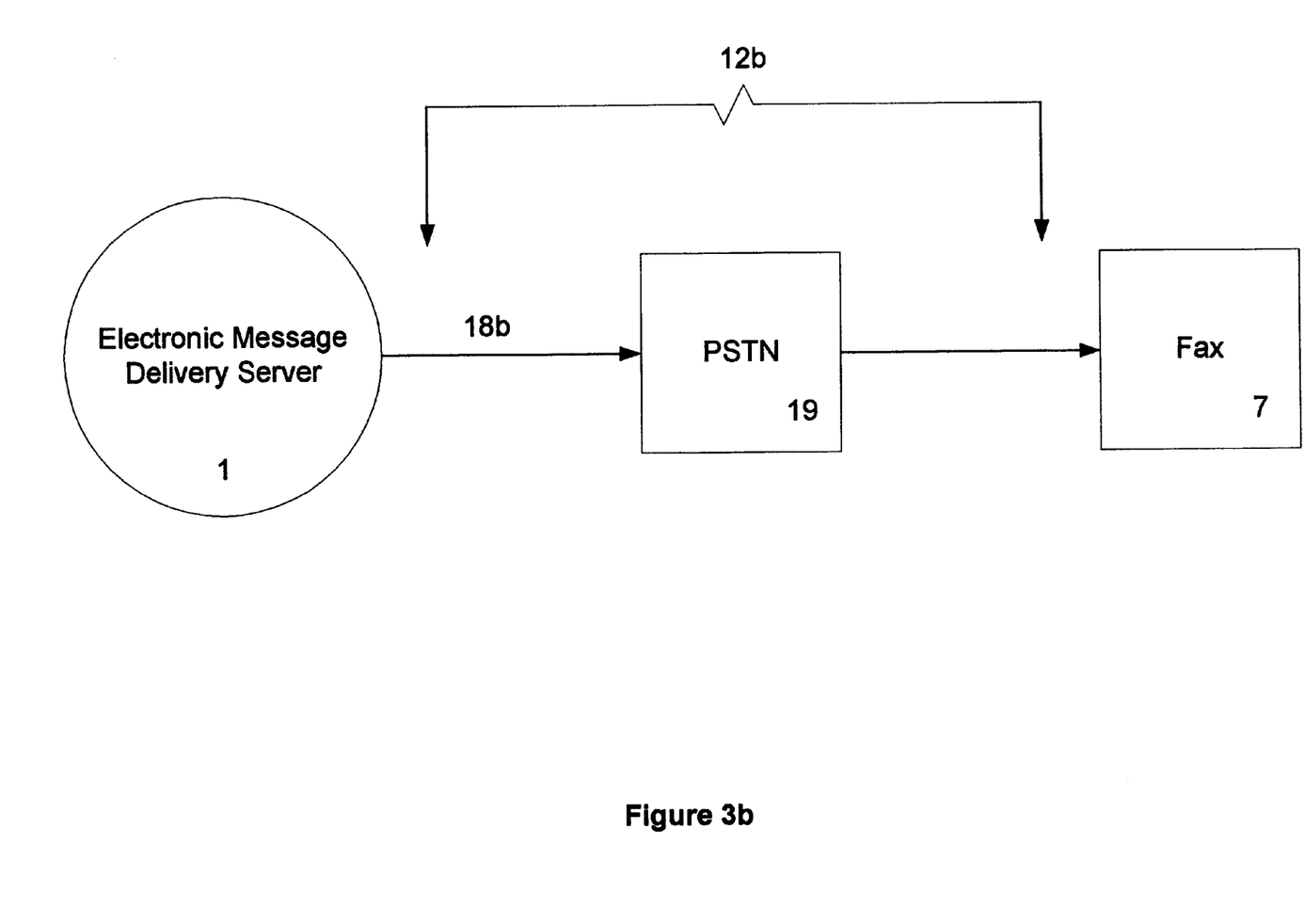
Figure 3C:
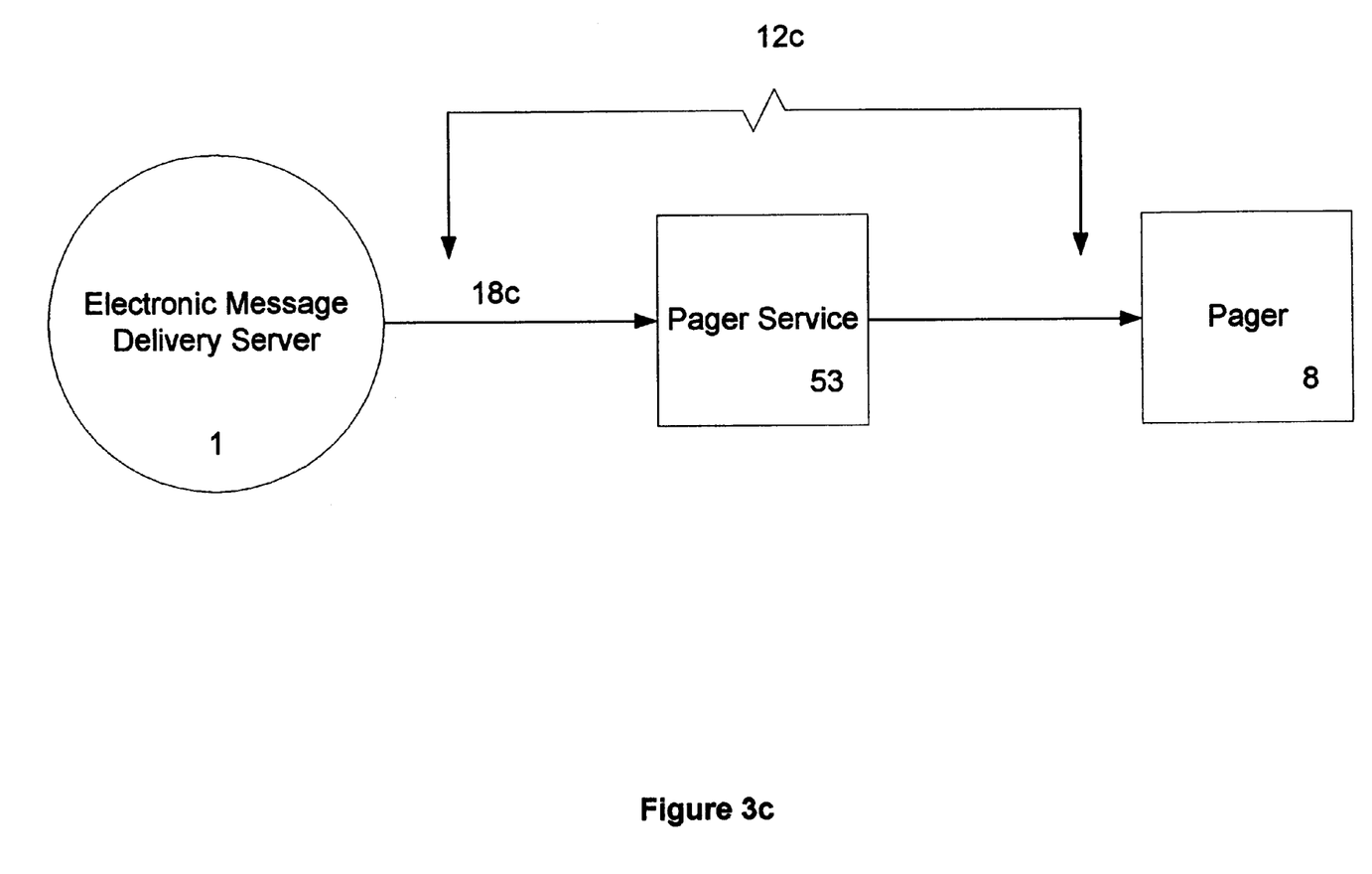
Figure 3D:
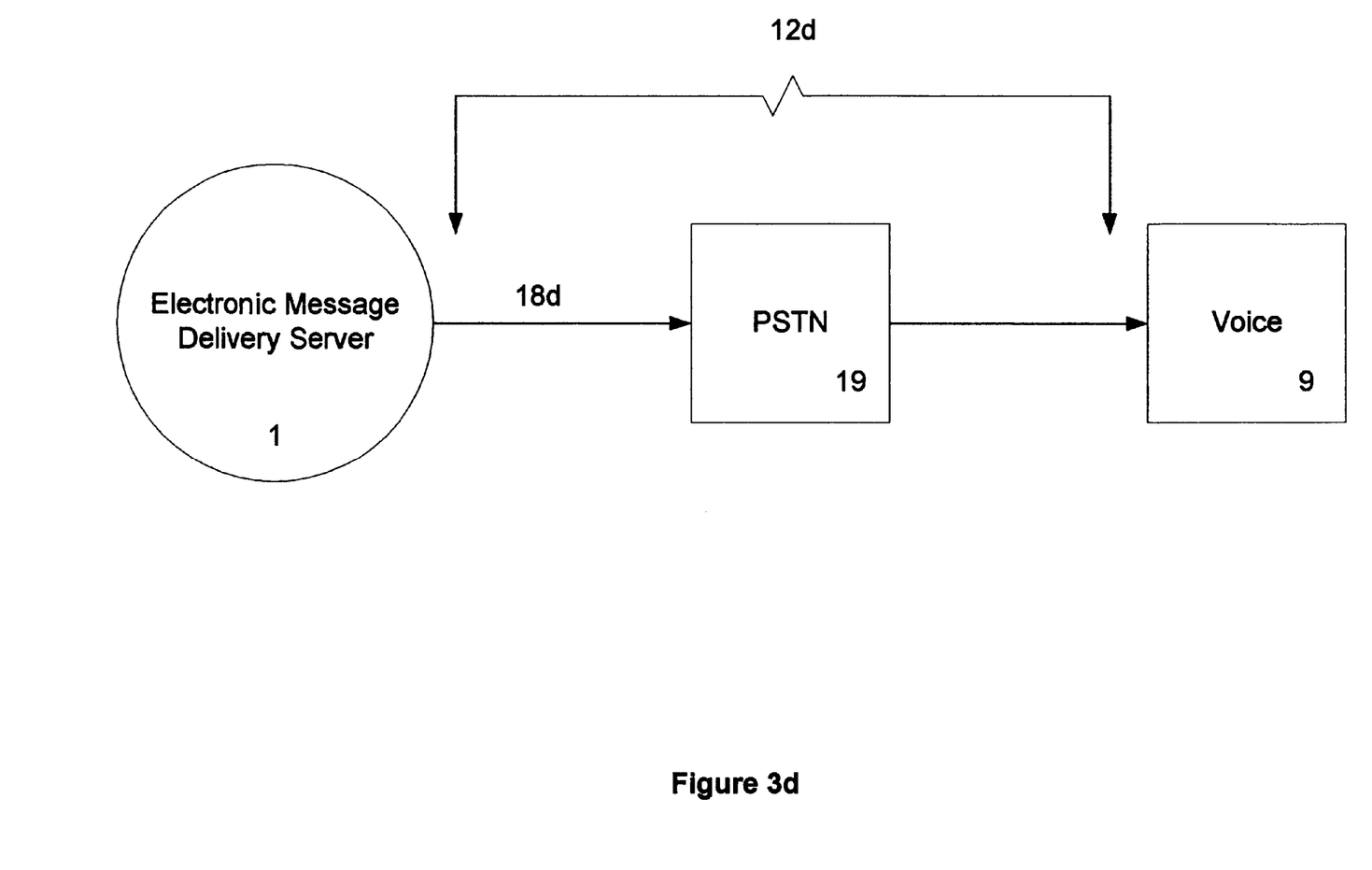

Based on the configuration of the user's message profile, the outgoing exception message (or messages) is then delivered to the specified end device or devices. FIGS. 3a–d show a more detailed view of the various outbound links 12a–d that connect the server 1 to the various electronic media. In FIG. 3a, server 1 sends the message over a telephone line 18a to the Internet 122 and deposits the message in the user's e-mail box 6. In FIG. 3b, server 1 sends the message over a telephone line 18b through the public telephone switched network (PTSN) 19 to the user's fax machine 7. In FIG. 3c, server 1 sends the message over a telephone line 18c to the user's pager service 53 and thence to the user's pager or PCS 8. In FIG. 3d, server 1 sends the message over a telephone line 18d through the PTSN 19 to the user's voice mail box 9. The same message may also be sent to a number of other devices as configured by the user 121 over the Internet 122. The same message that is being sent to a fax machine 7 as described above may also simultaneously be sent to an e-mail 6 recipient via the Internet. Preferably, different messages can be sent to different individuals simultaneously for the same fault condition; for example, the owner of the premises may receive a less-detailed message than the contractor.

A user's message profile can also be configured to store messages on server 1 for delivery at a later time or after certain conditions are met. For example, a contractor may not want his beeper activated every time server 1 receives an incoming exception message. The user profile can be configured to deliver messages on groups or only after several messages have accumulated for the same user/contractor. Optionally, an outgoing exception message may be generated only after several of the same type of incoming message are received; a portion of the memory of server 1 may be devoted to the storing and/or accumulating of messages. Alternatively, a single outgoing exception message may be generated in response to several incoming messages.

Figure 4:
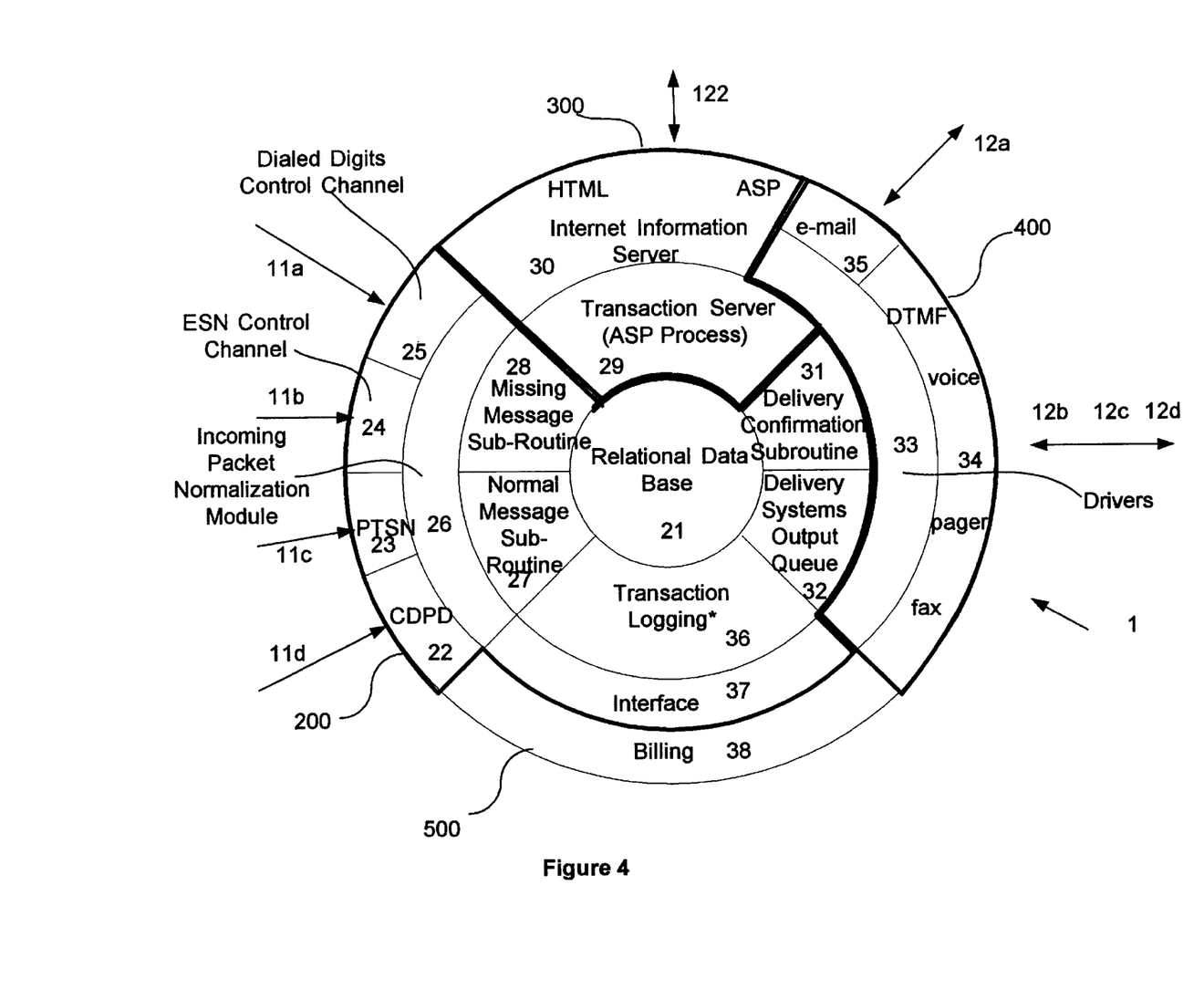
FIG. 4 is a schematic of a preferred embodiment of the electronic message delivery server according to the invention.

FIG. 4 shows the details of the message delivery server 1. In the preferred embodiment, server 1 includes four hardware devices 200, 300, 400, and 500. Device 200 is responsible for receiving incoming messages, processing them in accordance with the user's preferences, and routing them for output. Messages may be temporarily stored or accumulated on device 200 before being transmitted to the user if the user's message profile is set up accordingly. Device 300 enables the user 121 to access server 1 and create or edit his message profile residing in relational data base 21 of device 200. Device 400 includes the various drivers 33 which are responsible for transmitting the various messages to the various media (fax, e-mail, etc.). Device 500 includes billing computer 38 for keeping track of the charges and fees associated with the user's use of the service.

At the core of server 1 is a relational data base 21. Incoming messages are received by a specific service designed to handle both the transport method and message formatting. Every interface unit 10 is provided, like a cellular telephone, with an electronic serial number (ESN, to identify the specific interface unit sending the message) and a mobile identification number (MIN, similar to a cellular telephone's phone number). In some instances, the exception or status information is embedded in the dialed digits the interface transmits. The dialed digits control channel module 25 specifically receives messages that are encoded in the control channel's dialed digits (see U.S. Pat. No. 5,594,740). The ESN control channel module 24 receives messages that are encode in the electronic serial number of the message (U.S. Pat. No. 5,546,444). It is preferable to have both a dialed digits module 25 and an ESN module 24, because some geographic regions employ dialed digit data coding, while other regions employ ESN data coding. Information may be transmitted via the MIN of the interface 10 and also received by message delivery server 1. Services are also available to receive messages for analog modems connected to the public telephone switched network 23, and the cellular digital packet data network 22. As additional methods of transmitting data become available, they can be added to the services layer.

All incoming messages are normalized at the normalization module 26 so that all incoming messages can then be processed without regard to their incoming medium. All incoming messages are passed to the normal message subroutine 27, exception messages are passed on for processing and routing via the user's configuration through the data base 21, and periodic status messages are queued. The missing message subroutine 28 compares received status messages with a list of expected messages. Status messages that are not received have an error message generated by the missing message subroutine 28 which are then delivered as configured by the user in his message profile as recorded in the relational database 21.

Messages to be delivered are placed in a message queue 32; as message traffic permits the appropriate drivers 33 request messages from the message queue 32 and route the messages over the appropriate transport. Numeric pages, faxes, voice and DTMF 34 are sent over the PTSN 12*b–d*, e-mail 35 is sent over the Internet 122. When a driver 33 has successfully delivered, a record is made in the data base 21 by the delivery confirmation subroutine 31 showing time and date of successful deliveries. Undeliverable messages are routed back to the database for generation of undeliverable message errors.

Users 121 connect to an Internet information server 30 via the Internet 122. The Internet information server presents to the user the information pertaining to that user's interfaces. Requests to alter the user's data are passed through active server pages 29 to protect both the integrity and security of the data base 21. All messages and transactions that pass through the system are logged in section 36, the transaction and message logs are then interfaced by section 37 to a billing system 38.

An example of the system's operation is as follows. When a user-contractor 121 first signs up with the system 50, he receives an account on the electronic message delivery server 1. Via the Internet, the contractor 121 is prompted through software to enter the pager numbers, cellular telephone numbers, facsimile machine numbers, and Internet addresses of any individuals who are to be contacted in the event of an exception condition in building equipment 2–5 for which the contractor is responsible. The user-contractor 121 may also set the software to notify him of the periodic successful routine status check messages conveyed from equipment 2–5.

Figure 5:
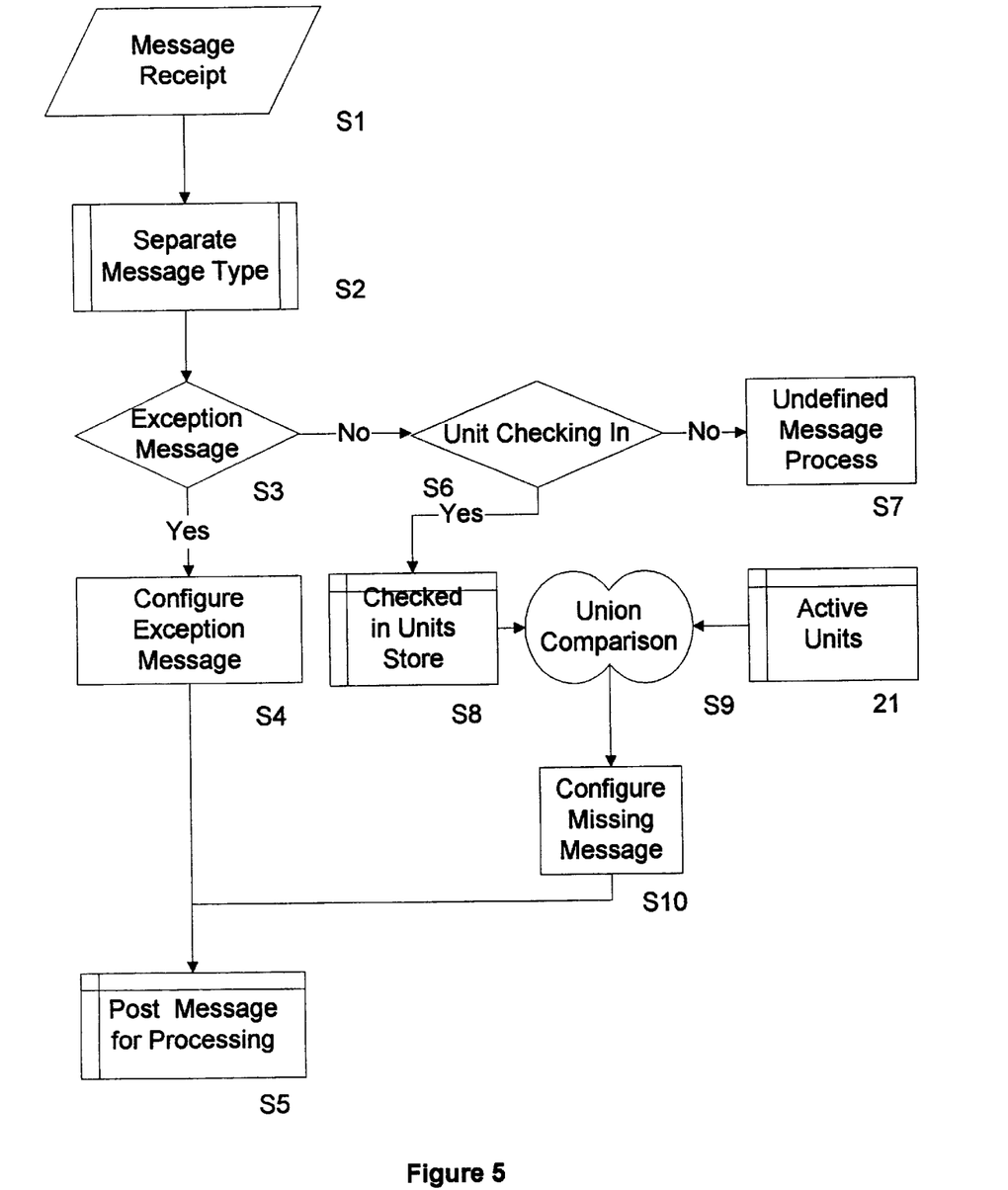
FIG. 5 is a flow chart depicting the operation of the system according to the invention.

FIG. 5 depicts a flow chart of the basic steps that occur when a message is received by server 1. At step S1, the message is received. At step S2, normalization module 26 removes the required elements from the incoming message and arranges them in a normalized format and stores them as a record in a table. Server 1 can now examine a specific element in a message of any received media type. At step S3, it is determined what type of error message has been received. If it is an exception message that requires immediate action, it is passed onto a process to begin configuration of a readable message at step S4 for delivery at step S5. If not, server 1 determines if the received message is a "unit checking in" or a "system ok" status message at step S6. If the user has his message profile so configured, a storing/accumulating step (not shown) may occur between steps S4 and S5. Undefined messages are handled at step S7. If it is configured as a periodic message received to indicate normal operation of a unit, the message is stored at step S8 for use at a later time. Periodically, the list of units that have reported in at step S8 and the list of active units expected to report in (part of database 21) are compared at step S9. Units on the active list that do not appear on the checked-in units list are processed, and units that failed to report in have messages created at step S10. These messages are then posted for further processing and message delivery at step S5.

In the example given, suppose boiler 3 breaks down in a non-catastrophic manner. The fault condition is detected by a sensor (not shown) and encoded to interface 10. Interface 10 transmits a radio message via link 13 to a local cell site 14, which contacts data circuits 17 via cellular network 16. Circuits 17 forward the message to message server 1. If the message is transmitted by the cellular telephone network 16, the ESN arrives via link 11*b* to ESN channel 24; alternatively, the dialed digits information arrives via link 11*a* to dialed digits channel 25. The message is normalized in normalization module 26 and passed along to the normalized message process module 27. Module 27 selects the user's message profile from relational database 21 and in accordance therewith, determines what message gets sent to whom and by which medium.

The invention is not limited to the above description but rather is defined by the claims appearing hereinbelow. Modifications to the above description that include that which is known in the art are well within the scope of the contemplated invention. For example, the invention is designed to be adaptable to all forms of electronic communication, be they cellular telephone, land line telephone, electronic mail, facsimile, text page, voice mail, etc. All forms of electronic media are contemplated as being within the scope of the invention. Also, multiple formats of incoming and outgoing messages are contemplated as included within the scope of the claims and the invention. The user can adjust the format and content of the messages he receives by setting up his message profile accordingly.

What is claimed is:

1. A method of monitoring remote equipment comprising the steps of:

a) determining a state of at least one parameter of at least one piece of the remote equipment;

b) communicating a message indicative of the state from the piece of remote equipment to a computer server as an incoming message;

c) enabling a user to remotely configure or modify a user-defined message profile containing outgoing message routing instructions, the user-defined message profile being storable on the computer server;

d) determining whether an incoming message is an incoming exception message indicative of improper operation of the piece of remote equipment;

e) if it is determined in step d) that an incoming message is an incoming exception message, forwarding at least one outgoing exception message based on the incoming message to at least one user-defined communication device specifiable in the user-defined message profile, wherein the user can remotely configure or modify the user-defined message profile by remotely accessing the computer server.

2. A method according to claim 1, wherein said step b) further comprises the step of communicating a plurality of incoming messages to the computer server via one of a plurality of different communication media.

3. A method according to claim 2, further comprising the step of normalizing the incoming messages into a uniform format to create normalized messages, wherein the outgoing exception messages are generated based on the normalized messages.

4. A method according to claim 1, wherein the at least one parameter is at least one of an exception condition and a normal status condition.

5. A method according to claim 1, wherein step (e) further comprises the step of determining whether an incoming message is a normal status message indicative of proper operation of the piece of remote equipment.

6. A method according to claim 1, wherein the remote configuring or modifying of the message profile enabled in step c) is performed by the user via the Internet.

7. A method according to claim 1, wherein the remote configuring or modifying of the message profile enabled in step c) further comprises the steps of:

1) selecting at least one type of user-defined communication device to which outgoing exception messages are to be forwarded;

2) selecting specific user-defined communication devices of the types selected in step 1); and 3) determining the content of the outgoing exception messages forwarded in step d).

8. A method according to claim 5, wherein if the incoming message is determined in step d) to be a normal status message from the remote equipment indicating proper operation of the equipment, the method further comprises the step of f) storing the normal status message in a normal status memory.

9. A method according to claim 8, further comprising the steps of:

g) providing a main list having information identifying all pieces of the remote equipment being monitored;

k) comparing the contents of the normal status memory with the main list to determine whether a normal status message was not communicated within a predetermined period of time for any pieces of the remote equipment being monitored; and l) generating an outgoing exception message in accordance with the message profile for each piece of equipment identified in step k) as not having sent a normal status message.

10. A method according to claim 1, wherein the computer server includes a database in which a plurality of message profiles may be stored, and wherein the remote configuring or modifying of the message profile enabled in step c) is performed by the user via the Internet.

11. A method according to claim 1, wherein the at least one remote communication devices specifiable by the message profile include at least one of a facsimile machine, an e-mail receiving device, a cellular telephone, a beeper, a pager, a PCS device, and a telephone.

12. A method according to claim 2, wherein the plurality of communication media of step b) includes at least one of a cellular telephone network, radio transmissions, telephone lines, and the Internet.

13. A method according to claim 1, wherein step e) further comprises forwarding multiple outgoing exception messages to multiple user-defined communication devices in response to a single incoming message in accordance with the user-defined message profile.

14. A method according to claim 1, wherein step e) further comprises forwarding a single outgoing exception message to a user-defined communication device in response to multiple incoming messages in accordance with the user-defined message profile.

15. A method according to claim 1, further comprising the step of storing a plurality of user-defined message profiles on the computer server.

16. A method according to claim 1, wherein the remote equipment includes heating, ventilating, and cooling equipment.

17. A method according to claim 1, wherein said step b) further comprises the step of communicating in the incoming message an identification code of the piece of remote equipment to which the incoming message pertains.

18. A method according to claim 17, wherein said step e) further comprises the step of forwarding the identification code in the outgoing exception message to the at least one user-defined communication device in accordance with the user-defined message profile.

19. A method according to claim 1, wherein step c) further comprises the step of enabling selection of different user-defined communication devices to receive outgoing exception messages at different time periods in accordance with the message profile, the message profile being definable to have the exception messages forwarded to different specified remote communication devices at different times.

20. A method according to claim 9, wherein step e) further comprises the step of enabling selection of different user-defined communication devices to receive outgoing exception messages at different time periods.

21. A method according to claim 5, wherein each normal status message includes operational information concerning the piece of remote equipment to which the normal status message pertains.

22. A system for monitoring remote equipment, comprising:

a sensor in local communication with a piece of remote equipment, said sensor detecting a state of at least one parameter of the piece of remote equipment;

an interface unit, locally connected to said sensor, said interface unit having a message generating mechanism; and a computer server in remote communication with said interface unit, said server adapted to receive messages generated by said interface unit, said computer server having a user interface, a user being capable of remotely accessing said computer server via said user interface to remotely configure a user-defined message profile containing outgoing message routing instructions, wherein when said sensor detects an exception condition in the piece of remote equipment, said interface unit generates an incoming exception message indicative of the exception condition and forwards said message to said server, and wherein said server forwards at least one outgoing exception message to at least one predetermined user-defined remote communication device based on said incoming exception message as specified in said user-defined message profile.

23. A system according to claim 22, wherein said message generating mechanism of the interface unit forwards said incoming exception messages to said computer server via at least one of a plurality of communication media, said media comprising at least one of a cellular telephone network, radio transmissions, telephone lines, and the Internet.

24. A system according to claim 23, said server comprising a normalization module, wherein said server receives said incoming exception messages from said interface unit and said normalization module normalizes said incoming exception messages into a uniform format to create normalized messages, wherein said outgoing exception messages are generated based on said normalized messages.

25. A system according to claim 22, wherein said sensor monitors at least one parameter of said piece of remote equipment, wherein the at least one parameter is at least one of an exception condition and a normal status condition.

26. A system according to claim 22, said system monitoring a plurality of pieces of equipment, each piece having an identification code, said server further comprising:
 a first memory on which equipment identification codes of all monitored equipment are stored;
 a second memory in which communication device identification codes of all of said user-defined communication remote devices are stored, said communication device identification codes being configured in a plurality of said user-defined message profiles.

27. A system according to claim 26, wherein said user interface is in communication with said second memory so that users can create or edit said user-defined message profiles remotely from said server.

28. A system according to claim 27, wherein said user interface enables a user to configure a user-defined message profile to select at least one type of communication device to which outgoing exception messages are to be forwarded, select specific user-defined communication devices of the types selected, and determine the content of said outgoing exception messages forwarded by said server to said user-defined communication devices.

29. A system according to claim 22, wherein said remote communication devices include at least one of a facsimile machine, an e-mail receiving device, a cellular telephone, a beeper, a pager, a PCS device, and a land line telephone.

30. A system according to claim 26, wherein said interface unit periodically generates a normal status message if said sensor to which said interface unit is connected detects a normal status condition indicative of proper operation of said respective piece of equipment to which said sensor is connected, said normal status message including an equipment identification code of said respective piece of equipment.

31. A system according to claim 30, said server further comprising:
 a third memory for storing said normal status messages;
 a comparator processor in communication with said first and third memories adapted to identify which of said pieces of monitored remote equipment having an identification code stored in said first memory did not communicate a normal status message stored in said third memory within a predetermined period of time; and
 a server message generator in communication with said comparator processor adapted to generate an outgoing exception message for each piece of equipment identified by said comparator processor, said outgoing exception message being forwarded by said server to at least one of said user-defined communication devices specified by at least one of said user-defined message profiles.

32. A system according to claim 30, said server further comprising a normalization module, wherein said server receives said incoming exception messages from said interface unit and said normalization module normalizes said incoming exception messages into a uniform format to create normalized messages, wherein said outgoing exception messages are generated based on said normalized messages.

33. A system according to claim 26, said interface unit comprising a plurality of remote interface units, wherein each of said plurality of remote interface units is locally respectively connected to a single piece of said remote pieces of equipment.

34. A system according to claim 26, said interface unit comprising a plurality of remote interface units, wherein each of said plurality of interface units is locally connected to a plurality of sensors which are in turn respectively connected to a number of said remote pieces of equipment.

35. A system according to claim 26, wherein said user-defined message profiles are each remotely configurable by a user to cause said server to forward a plurality of said outgoing exception messages in response to receipt of a single incoming exception message in accordance with the user-defined message profile.

36. A system according to claim 26, wherein said user-defined message profiles are each remotely configurable by a user to cause said server to forward a single of said outgoing exception messages in response to receipt of multiple incoming exception messages in accordance with the user-defined message profile.

37. A system according to claim 31, wherein said computer server is adaptable to forward a plurality of said outgoing exception messages for each piece of equipment identified by said comparator processor in accordance with the user-defined message profile.

38. A system according to claim 22, wherein said incoming exception message comprises exception information and identification information concerning said piece of remote equipment.

39. A system according to claim 38, wherein said outgoing exception message comprises exception information and identification information concerning said piece of remote equipment to which said normal status message pertains.

40. A system according to claim 30, wherein said normal status message further comprises operational information of said piece of remote equipment to which said normal status message pertains.

41. A system according to claim 31, said computer server further comprising a fourth memory upon which outgoing exception messages are stored.

42. A method for monitoring remote equipment comprising the steps of:
 a) determining a state of at least one parameter of at least one piece of the remote equipment;
 b) communicating a message indicative of the state to a computer server as an incoming message, the incoming message having a respective incoming format;
 c) normalizing the incoming message to form a corresponding normalized message having a predetermined uniform format;
 d) storing the normalized message in a normalized message database on the computer server;

e) determining from the incoming message whether at least one exception message related to the incoming message is to be sent to at least one remote communication device specified by a plurality of message profiles stored at the computer server;

f) if it is determined in step e) that at least one exception message related to the incoming message is to be sent, deriving the at least one exception message from the stored normalized message corresponding to the related incoming message and the message profiles, the at least one exception message derived thereby having a respective format suitable for reception by the at least one remote communication device to which the at least one exception message is to be sent; and g) sending the at least one exception message derived in step f) to the at least one remote communication device specified by the message profiles, wherein the message profiles may be created or modified at least in part by a user by remote access of the computer server.

43. A system for monitoring remote equipment, comprising:

a sensor in communication with a piece of the remote equipment for detecting the state of at least one parameter thereof;

an interface unit, coupled to said sensor, said interface unit having a message generating mechanism for generating messages indicative of the state of the at least one parameter of the piece of the remote equipment; and a computer server in communication with said interface unit, said server comprising:

a message interface for receiving messages generated by said interface unit;

a message normalizer for normalizing each one of the messages received from the interface unit to form corresponding normalized messages having a predetermined uniform format;

a normalized message database for storing normalized messages, including normalized messages from the message normalizer;

a message profile database for storing a plurality of message profiles;

a message processor for determining from each one of the messages received from the interface unit whether at least one exception message related to the received message is to be sent to at least one remote communication device specified by the message profiles;

an exception message generator for deriving the at least one exception message determined to be sent by the message processor to the at least one remote communication device, the at least one exception message being derived from a normalized message corresponding to the related message received from the interface unit and the message profiles, the at least one exception message derived thereby having at least one respective format suitable for reception by the at least one remote communication device to which the at least one exception message is to be sent;

a message interface for sending the at least one exception message derived by the exception message generator to the at least one remote communication device specified by the message profiles; and a user interface for enabling a user at a remote location to create or modify at least a portion of the message profiles in the message profile database, wherein when said sensor detects an exception condition in the piece of remote equipment, said interface unit generates an incoming message indicative of the exception condition and forwards said message to said server.

* * * * *